United States Patent [19]

Hanson et al.

[11] Patent Number: 4,755,972
[45] Date of Patent: Jul. 5, 1988

[54] METHOD OF SEISMIC EXPLORATION INCLUDING PROCESSING AND DISPLAYING SHEAR WAVE SEISMIC DATA

[75] Inventors: Kenneth E. Hanson, Broken Arrow; Leon A. Thomsen, Tulsa, both of Okla.

[73] Assignee: Amoco Corporation, Chicago, Ill.

[21] Appl. No.: 780,523

[22] Filed: Sep. 26, 1985

[51] Int. Cl.⁴ .............................................. G01V 1/053
[52] U.S. Cl. .......................................... 367/75; 367/37
[58] Field of Search .................. 367/56, 59, 70, 75; 364/421

[56] References Cited

U.S. PATENT DOCUMENTS

| | | | |
|---|---|---|---|
| 3,193,832 | 10/1962 | Heintz | 367/70 |
| 4,316,267 | 2/1982 | Ostrander . | |
| 4,316,268 | 2/1982 | Ostrander . | |
| 4,398,273 | 8/1983 | Thompson et al. | 364/421 X |
| 4,437,176 | 3/1984 | Mack | 367/56 X |
| 4,534,019 | 8/1985 | Wiggins et al. | 367/75 |
| 4,562,558 | 12/1985 | Ostrander | 367/59 X |
| 4,575,830 | 3/1986 | Ingram et al. | 367/75 X |
| 4,646,239 | 2/1987 | Bodine et al. | 367/38 X |

OTHER PUBLICATIONS

"Geological Interpretation of Color Seismic Displays," R. E. Sheriff et al., p. 18, vol. 23, No. 8, 1977, Oil & Gas.
"Quantitative Seismology Theory & Method", K. Aki et al; Freeman & Company, San Francisco, 1980, pp. 144–151.

Primary Examiner—Thomas H. Tarcaza
Assistant Examiner—Tod Swann
Attorney, Agent, or Firm—Timothy D. Stanley

[57] ABSTRACT

A method of seismic exploration including processing and displaying shear wave seismic data for identifying gaseous hydrocarbon-containing formations and for inferring changes in the geological character of subterranean formations. A measure of the shear wave reflection coefficient is obtained for selected seismic events in the shear wave seismic data. Measures of formation property contrasts represented by the selected seismic event are obtained from the shear wave reflection coefficients.

29 Claims, 5 Drawing Sheets

METHOD OF SEISMIC EXPLORATION INCLUDING PROCESSING AND DISPLAYING SHEAR WAVE SEISMIC DATA

BACKGROUND OF THE INVENTION

The present invention relates generally to a novel method of seismic exploration, and more particularly, to a method of shear wave seismic exploration for identifying gaseous hydrocarbon-containing formations and for inferring changes in the geological character of the formations. Shear wave seismic data, including a plurality of shear wave seismic signals or traces representative of the earth's response to imparted seismic energy, are obtained by seismic receivers. A measure of the shear wave reflection coefficient is obtained for selected seismic events within the seismic data. Attributes quantitatively descriptive of variations in the shear wave reflection coefficient as a function of incident angle are developed from shear wave seismic signal amplitudes for the selected seismic events. Predetermined combinations of such attributes can provide the geophysicist with measures of the rigidity contrast and density contrast for selected seismic events which can be extremely accurate diagnostic tools for identifying and quantifying gaseous hydrocarbon-containing formations and for inferring changes in the subterranean formations.

In the continuing search for hydrocarbons contained in the earth's subterranean formations, exploration geophysicists have developed numerous techniques for imparting seismic wave energy into the earth's subterranean formations, recording the reflected seismic waves and processing the recorded seismic data to produce seismic signals or traces. Such seismic signals or traces contain a multiplicity of information, e.g., frequency, amplitude, phase, etc., which have been related to formation structure, lithology or pore fluid content. More recently geophysicists' interests have focused on variations in the seismic signal amplitude and compressional wave reflection coefficient as a function of range or incident angle. Exemplary of such focus are: Ostrander, U.S. Pat. No. 4,316,267 and 4,316,268 and Wiggins, et al., U.S. Pat. No. 4,534.019.

In particular, Ostrander indicates that progressive change in compressional wave reflection coefficient as a function of angle of incidence can occur, and more likely than not, such progressive change is an indicator of the presence of a gas-bearing formation. Specifically, after specified processing, progressive seismic signal amplitude change, in an increasing or decreasing manner with increasing range, is the criterion for identifying gas-bearing formations. Ostrander also discloses a method for seismic signal enhancement to improve the visual resolution of such progressive changes in compressional seismic wave signal amplitude as a function of range or incident angle.

On the other hand, Wiggins indicates that for a common depth point gather of reflected compressional wave seismic energy, coefficients descriptive of the variation of such seismic trace signal amplitudes as a function of $\sin^2\theta$ can be summed to obtain a measure of the shear wave velocity reflectivity of the earth's subterranean formation However, the techniques of Ostrander and Wiggins employed to locate gaseous hydrocarbon-containing formations and to identify subterranean features, have been limited to the evaluation of the compressional wave reflection coefficient as observed in compressional wave seismic energy and in the variations of the recorded compressional wave seismic signal or trace amplitude as a function of incident angle. In fact, the focus of those skilled in the art has been limited to compressional wave seismic data, apparently due to the conventional belief that reflected shear wave seismic energy is insensitive to changes in the pore fluid content of the earth's subterranean formations, whereas the reflected compressional wave seismic energy is sensitive to changes in pore fluid content of the earth's subterranean formations.

SUMMARY OF THE INVENTION

In accordance with the present invention, a novel method of seismic exploration is disclosed including processing and displaying shear wave seismic data for identifying gaseous hydrocarbon-containing formations and for inferring changes in the geological character of subterranean formations. More particularly, shear wave seismic data including a plurality of reflected shear wave seismic signals or traces representative of the earth's response to imparted seismic energy are obtained with seismic receivers. A measure of the shear wave reflection coefficient as a function of incident angle is obtained for selected seismic events within the shear wave seismic data. Sets of attributes, descriptive of variations in the shear wave seismic signal amplitude of reflected shear wave seismic energy, as a function of incident angle for selected seismic events, are generated from the reflection coefficient. Predetermined combinations of the attributes can provide a measure of the rigidity contrast and density contrast separately for selected seismic events which can be extremely accurate diagnostic tools for identifying gaseous hydrocarbon-containing formations and for inferring changes in the geological character of subterranean formations.

Further, displays of the formation property contrasts can be overlayed on a corresponding seismic section of shear wave seismic signals. Color-vector plots of the formation property contrasts can also be employed to highlight subtle changes in the amplitude of the shear wave seismic signal trace as a function of incident angle. The subtle changes are useful in inferring changes in the geology, geological character, lithological contrast and pore fluid content.

DETAILED DESCRIPTION OF THE PREFERRED EMBODIMENT

The present invention discloses a novel method for processing and displaying shear wave seismic data for quantitatively identifying gaseous hydrocarbon-containing formations and for inferring changes in the geological character of subterranean formations.

In order to facilitate a clear understanding of the present invention, a brief description of certain basic principles of the reflection and transmission of seismic wave energy in the earth's subterranean formations is provided. It is understood by those skilled in the art that seismic prospecting conventionally depends upon changes in impedance within the earth's subterranean formations. A change in impedance from one formation to another causes normally incident seismic wave energy to be reflected at the interface of the two formations. Impedance can be defined as the product of the formation density and formation seismic wave velocity.

Through the generation of compressional wave seismic signals or traces, estimates of the normal incident reflection coefficient for compressional waves $R_c(0°)$ can be obtained which provide a measure of the change in compressional impedance according to Equation (1).

$$R_c(0°) = A_r/A_i = \frac{\rho_2 \alpha_2 - \rho_1 \alpha_1}{\rho_1 \alpha_1 + \rho_2 \alpha_2} \quad (1)$$

Additionally, through the generation of shear wave seismic signals, estimates of the normal incident reflection coefficient for shear waves $R_s(0°)$ can be obtained which provide a measure of the change in shear impedance according to Equation (2).

$$R_s(0°) = A_r/A_i = \frac{\rho_2 \beta_2 - \rho_1 \beta_1}{\rho_1 \beta_1 + \rho_2 \beta_2} \quad (2)$$

Figure 1:
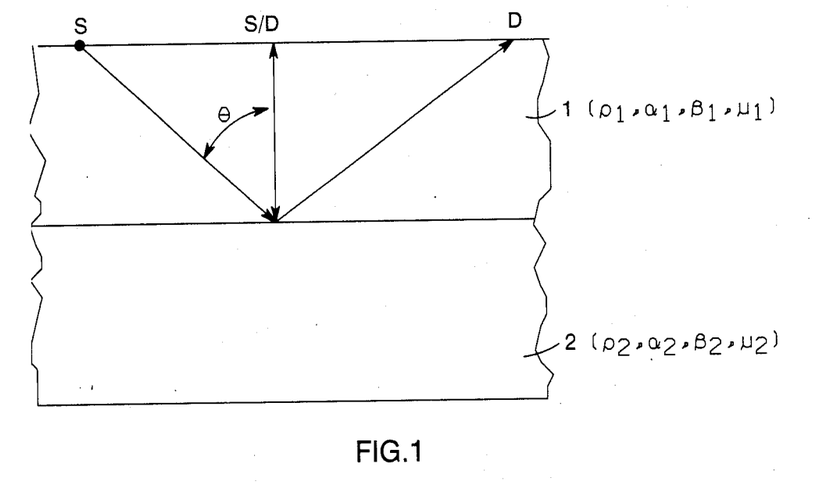
FIG. 1 is a schematic representation of normal and nonnormal incident seismic waves impinging upon a subterranean formation interface.

In Equations (1) and (2), $A_r$ is the amplitude of the reflected seismic wave (compressional or shear) and $A_i$ is the amplitude of the corresponding normally incident seismic wave. As shown in FIG. 1, seismic energy is imparted and detected at S/D; $\alpha_1$ is the compressional wave velocity in the overlying formation 1; $\alpha_2$ is the compressional wave velocity in the underlying formation 2; $\rho_1$ is the density of the overlying formation 1; $\rho_2$ is the density of the underlying formation 2; $\beta_1$ is the shear wave velocity in the overlying formation 1; and $\beta_2$ is the shear wave velocity in the underlying formation 2.

Figure 2:
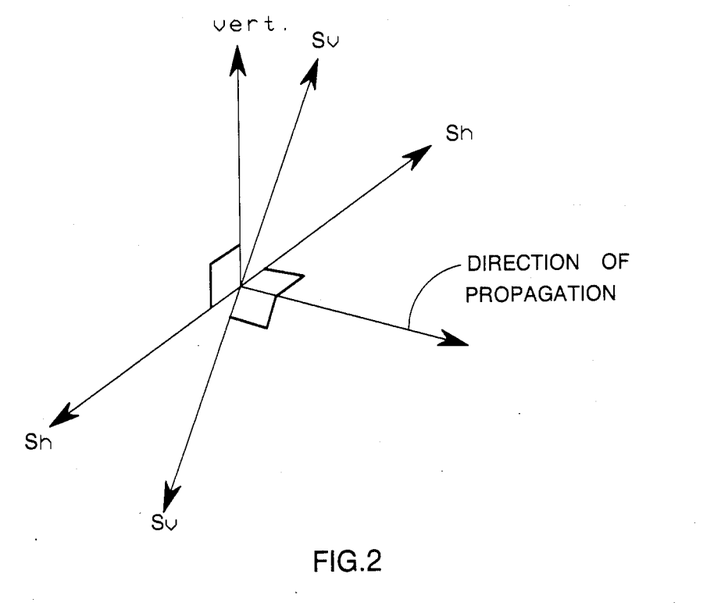
FIG. 2 is a schematic representation of the Sh and Sv axes of particle motion with respect to the direction of propagation of shear wave seismic energy.

Reflected shear wave seismic energy can be obtained by imparting shear wave (Sh or Sv) seismic energy, respectively, into the earth's subterranean formations. Those skilled in the art appreciate that reflected shear wave seismic energy can be resolved into two mutually independent components. Such components can be defined as the Sh and Sv components where the axes of particle motion are orthogonal (i.e., mutually perpendicular) as seen in FIG. 2. Hereafter, the Sh component of the reflected shear wave seismic energy will be understood to comprehend a shear wave in which the particle motion is constrained to the Sh axis shown in FIG. 2 (i.e., no vertical component), whereas the Sv component of the reflected shear wave seismic energy will be understood to comprehend a shear wave in which the particle motion has a vertical component, as shown in FIG. 2. In both Sh and Sv shear wave seismic energy, the direction of vibration is perpendicular to the direction of propagation of the shear wave seismic energy as shown in FIG. 2. In order to generate shear wave seismic signals or traces representative of the reflected horizontal or vertical shear wave seismic energy, shear wave receivers having a line of action coincident with the horizontal component of the reflected shear wave seismic energy line of action are employed. The reflection coefficient $R_s(0°)$ in Eq. (2) usually refers to both the Sh and Sv components of the reflected seismic wave energy and which are equivalent at normal incidence.

REFLECTED SHEAR WAVES

The reflection coefficients for nonnormal incident seismic wave energy depend, in addition to the angle of incidence, on other combinations of physical properties rather than impedance in the adjacent formations. We have found that for the reflected Sh shear wave component of the shear wave seismic energy, the shear wave reflection coefficient as a function of incident angle can be simply approximated by Equation (3) for a selected seismic event.

$$R_{Sh}(\theta) = -(\tfrac{1}{2})[(\Delta\mu/\mu) + (\Delta\rho/\rho)] + \quad (3)$$
$$(\tfrac{1}{2})[(\Delta\mu/\mu) - (\Delta\rho/\rho)]\tan^2\theta$$

Here, $R_{Sh}(\theta)$ is the reflection coefficient for the Sh component of the reflected shear wave seismic energy. Referring to FIG. 1, $\mu$ is the average shear wave modulus (rigidity) of adjacent formations 1 and 2 (i.e., $2\mu = \mu_1 + \mu_2$); $\rho$ is the average density of adjacent formations 1 and 2 (i.e., $2\rho = \rho_1 + \rho_2$); and $\Delta\mu$ and $\Delta\mu$ indicate a change in a given property between adjacent formations 1 and 2 (e.g., $\Delta\mu = \mu_2 - \mu_1$). Here also, $\Delta\mu/\mu$ represents the fractional rigidity contrast at the reflecting boundary for the selected seismic event and $\Delta\rho/\rho$ represents the fractional density contrast at the reflecting boundary for the selected seismic event. The angle of incidence for the selected seismic event is represented by $\theta$ in FIG. 1. Equation (3) can be employed for small fractional contrasts.

For the reflected Sv component of the shear wave seismic energy, an approximation of the exact plane wave solution for the Sv shear wave reflection coefficient $R_{Sv}(\theta)$ at any angle of incidence has been developed (K. Aki and P. G. Richards, "Quantitative Seismology Theory and Method," Freeman and Company, San Francisco, 1980, p. 153-154) and can be reformulated as Equation (4) for a selected seismic event.

$$R_{Sv}(\theta) = -(\tfrac{1}{2})[(\Delta\mu/\mu) + (\Delta\rho/\rho)] + \quad (4)$$
$$(\tfrac{1}{2})[7(\Delta\mu/\mu) + (\Delta\rho/\rho)]\tan^2\theta - 2(\Delta\mu/\mu)\tan^2\theta\sin^2\theta$$

Here, $R_{Sv}(\theta)$ is the reflection coefficient for the Sv component of the reflected shear wave seismic energy; $\mu$ is the average shear wave modulus of adjacent formations 1 and 2 as seen in FIG. 1; $\rho$ is the average density of adjacent formations 1 and 2, and $\Delta\rho$ and $\Delta\mu$ indicate a change in a given property between adjacent formations 1 and 2. Here also, $\Delta\mu/\mu$ represents the fractional rigidity contrast at the reflecting boundary for the selected seismic event and $\Delta\rho/\rho$ represents the fractional density contrast at the reflecting boundary for the selected seismic event. The angle of incidence for the selected seismic event is represented by $\theta$.

It is possible to combine the shear wave reflection coefficients $R_{Sv}(\theta)$ and $R_{Sh}(\theta)$ in such a manner that measures of the property contrasts $\Delta\mu/\Delta$ and $\Delta\mu/\mu$ result separately.

By way of example, for an incident angle $\theta = 27°$, $\tan^2\theta \approx \frac{1}{4}$. Equations (3) and (4) provide:

$$R_{Sv}(27) + R_{Sh}(27) \approx -[\tfrac{1}{4}](\Delta\rho) \quad (5)$$

i.e., the average of $R_{Sv}$ and $R_{Sh}$ at "midranges"(near $\theta = 27°$) is directly proportional to the measure of the fractional density contrast $\Delta\rho/\rho$. For the incidence angle $\theta = 0°$ (normal incidence), $\tan\theta^2 = 0$, and $$R_{Sv}(0) + R_{Sh}(0) = -[\tfrac{1}{4}][(\Delta\mu/\mu) + (\Delta\rho/\rho)] \quad (6)$$

Thus, the measure of the fractional rigidity contrast $\Delta\mu/\mu$ is directly proportional to the algebraic difference between the "near-range" ($\theta = 0°$) and "midrange" ($\theta = 27°$) averages as shown in Eq. (7) below.

$$[R_{Sv}(0) + R_{Sh}(0)] - [R_{Sv}(27) + R_{Sh}(27)] \approx -(\tfrac{1}{4})(\Delta\mu/\mu) \quad (7)$$

Finally, the relative value of the fractional rigidity contrast compared to the fractional density contrast can be obtained from the ratio of the near-range and midrange averages of the reflection coefficients as shown below:

$$[R_{Sv}(0) + R_{Sh}(0)]/[R_{Sh}(27)] + R_{Sv}(27)] - 1 \approx (\Delta\mu/\mu)/(\Delta\rho/\rho) \quad (8)$$

Those skilled in the art will recognize that, when seismic data has been processed for true relative amplitude, the processed trace at any offset is proportional to the earth's corresponding reflection coefficient series convolved with the seismic wavelet, so that the sums in Eqs. (5-8) can be implemented on a trace-by-trace basis using true relative amplitude seismic traces to provide separate seismic sections of fractional density contrast only and of fractional rigidity contrast only. The appropriate seismic source - receiver offset x corresponding to the midrange assumption such that $\theta = 27°$ is, of course, dependent on the depth z of the subsurface reflecting boundary and, from purely geometrical considerations, is found to be given simply by $x \approx z$. If the velocity increases significantly with depth in the overlying beds, the rays will curve, and those skilled in the art will recognize that this curvature must be taken into account.

Both Equations (3) and (4) can also be represented respectively as Equations (9) and (10) below for angles of incidence $\theta$ approximately no more than 35°.

$$R_{Sh}(\theta) = D_0 + D_1 \tan^2\theta \quad (9)$$

$$R_{Sv}(\theta) = C_0 + C_1 \tan^2\theta \quad (10)$$

where
$D_0 = -(\tfrac{1}{4})[(\Delta\mu/\mu) + (\Delta\rho/\rho)]$; $D_1 = (\tfrac{1}{4})[(\Delta\rho/\rho) - (\Delta\rho/\rho)]$
$C_0 = -(\tfrac{1}{4})[(\Delta\mu/\mu) + (\Delta\rho/\rho)]$; $C_1 = (\tfrac{1}{4})[7(\Delta\mu/\mu) + (\Delta\rho/\rho)]$ Measures of the fractional rigidity contrast $\Delta\mu/\mu$ and the fractional density contrast $\Delta\rho/\rho$ can then be separately obtained from the Sh shear wave attributes only ($D_0$ and $D_1$) via the algebraic relationships below:

$$D_0 + D_1 = -(\tfrac{1}{4})[\Delta\rho/\rho] \quad (11)$$

$$D_0 - D_1 = -(\tfrac{1}{4})[\Delta\mu/\mu] \quad (12)$$

A relative measure of the fractional rigidity contrast compared to the fractional density contrast as a function of the ratio $D_1/D_0$ is shown below:

$$[1 - (D_1/D_0)]/[1 + (D_1/D_0)] = \frac{\Delta\mu/\mu}{\Delta\rho/\rho} \quad (13)$$

A similar separation of the fractional rigidity contrast and fractional density contrast for a subsurface reflector represented by the seismic event can be performed using the Sv attributes $C_0$, $C_1$ only.

All of the foregoing shear wave reflection coefficient expressions have been developed assuming the earth behaves as though it were isotropic. For such isotropic formations, the Sv attributes simply provide redundant information to that already obtained from the Sh attributes. For anisotropic formations, the two sets of attributes $C_0$, $C_1$ and $D_0$, $D_1$ can be employed to provide a measure of anisotropy.

REFLECTED COMPRESSIONAL WAVES

For reflected compressional wave seismic energy, a similar formulation of the compressional wave reflection coefficient for nonnormal incidence in terms of the angle of incidence and compressional wave attributes can be obtained by reformulating the Aki approximation to the exact plane wave solution.

Although the shear wave reflection coefficients $R_{Sh}(\theta)$ and $R_{Sv}(\theta)$ have the same general functional dependence on the angle of incidence $\theta$ as does the resulting compressional wave reflection coefficient, the shear wave attributes ($C_0$, $C_1$ and $D_0$, $D_1$) have different physical meaning and interpretation than the corresponding compressional wave attributes. In particular, the shear wave attributes ($C_0$, $C_1$ and $D_0$, $D_1$) can provide measures of both the fractional rigidity contrast and the fractional density contrast separately, whereas Wiggins indicated that the compressional wave attributes can provide a measure of the shear-velocity reflectivity and that the shear-velocity reflectivity was insensitive to the fluid content of formations. Those skilled in the art recognize that shear-velocity reflectivity is composed of a multiplicative combination of fractional rigidity and density contrasts, and cannot be decomposed into these property contrast components separately without additional, independent information. Furthermore, those skilled in the art will appreciate that compressional wave velocity and impedance, while sensitive to the presence or absence of gas in the pore space, is insensitive to the amount of gas therein. As such, compressional wave velocity and impedance are merely qualitative indicators of gas, but not quantitative indicators. In contradistinction, the fractional density contrast, as obtained by the present invention and discussed below, can be a quantitative indicator of gas.

RIGIDITY - DENSITY SYSTEMATICS

A seismic formation property model has been developed to gain physical insight into the expected behavior of the formation rigidity contrasts and formation density contrasts in certain cases of seismic exploration interest. The density $\rho$ of a fluid saturated, porous formation can be expressed by:

$$\rho = \rho_s * (1-\phi) + \rho_f * \phi \qquad (14)$$

The rigidity $\mu$ of this same formation can be given approximately by:

$$\mu = \mu_s * (1 - 2 - 34\phi_c) \qquad (15)$$

where $\rho_s$ and $\mu_s$ are the density and rigidity, respectively, of the solid mineral grains within the formation, $\rho_f$ is the density of the fluid or fluid mixture within the formation, $\phi$ is the total bulk porosity of the formation, and $\phi_c$ is the "crack" porosity of the formation (assumed to be much less than the total bulk porosity $\phi$ and to comprise that portion of the pore shape distribution which is thin and flat).

These model results indicate that a change in fluid content only ($\rho_f$) at a reflecting boundary will cause a finite fractional density contrast ($\Delta\rho/\rho \neq 0$) and no fractional rigidity contrast ($\Delta\mu/\mu = 0$). This situation is referred to as a "Fluid Contact" reflection event. On the other hand, a change in crack porosity ($\phi_c$), only, at a reflecting boundary will cause no fractional density contrast ($\Delta\rho/\rho = 0$) and a finite fractional rigidity contrast ($\Delta\mu/\mu \neq 0$). This situation is referred to as a "Fractures" reflection event.

Most sedimentary rocks statistically obey a systematic relationship between rigidity and density which can be expressed by the linear equation:

$$\mu = a + b * \rho \qquad (16)$$

where, for a water-saturated uncracked formation, a and b can be represented through Eqs. (14) and (15) as:

$$a = -\mu_s * [(\rho_s + 1)/(\rho_s - 1)]$$

$$b = 2\mu_s * [1/(\rho_s - 1)]$$

The fractional rigidity contrast ($\Delta\mu/\mu$) and the fractional density contrast ($\Delta\rho/\rho$) at a subsurface boundary between any two adjacent formations obeying the systematic relationship expressed in Eq. (16) are then related by:

$$\Delta\mu/\mu = [\rho/(\rho + a/b)] * \Delta\rho/\rho \qquad (17)$$

where
$a/b = -[\frac{1}{2}] * (1 + \rho_s)$

Thus the fractional rigidity contrast and density contrast are positively correlated ($\Delta\mu/\mu \sim \Delta\rho/\rho$) for values of $\rho > 2$ and $\rho_s < 3$, such values being appropriate for water saturated sedimentary formation. Moreover, the magnitude of the fractional rigidity contrast relative to the fractional density contrast is approximately determined simply by the magnitude of the average density according to:

$$(\Delta\mu/\mu)/(\Delta\rho/\rho) \sim \rho/(\rho - 2) \qquad (18)$$

This situation is referred to as a "Normal Lithology" reflection event.

There are known lithologies whose rigidity and density values do not conform to the foregoing systematic relationships. These lithologies include salt and water-saturated coal, which agree more closely with gas-bearing formation systematics, and anhydrite, which is likely to exhibit a negative rigidity - density correlation when contrasted with "Normal Lithology" formations (i.e., $-\Delta\mu/\mu \sim \Delta\rho/\rho$). Reflections from such formations are termed "Tight" events.

EXAMPLE

The general behavior of shear wave reflection coefficients can now be examined in the specific context of the foregoing rigidity - density systematics.

Figure 3:
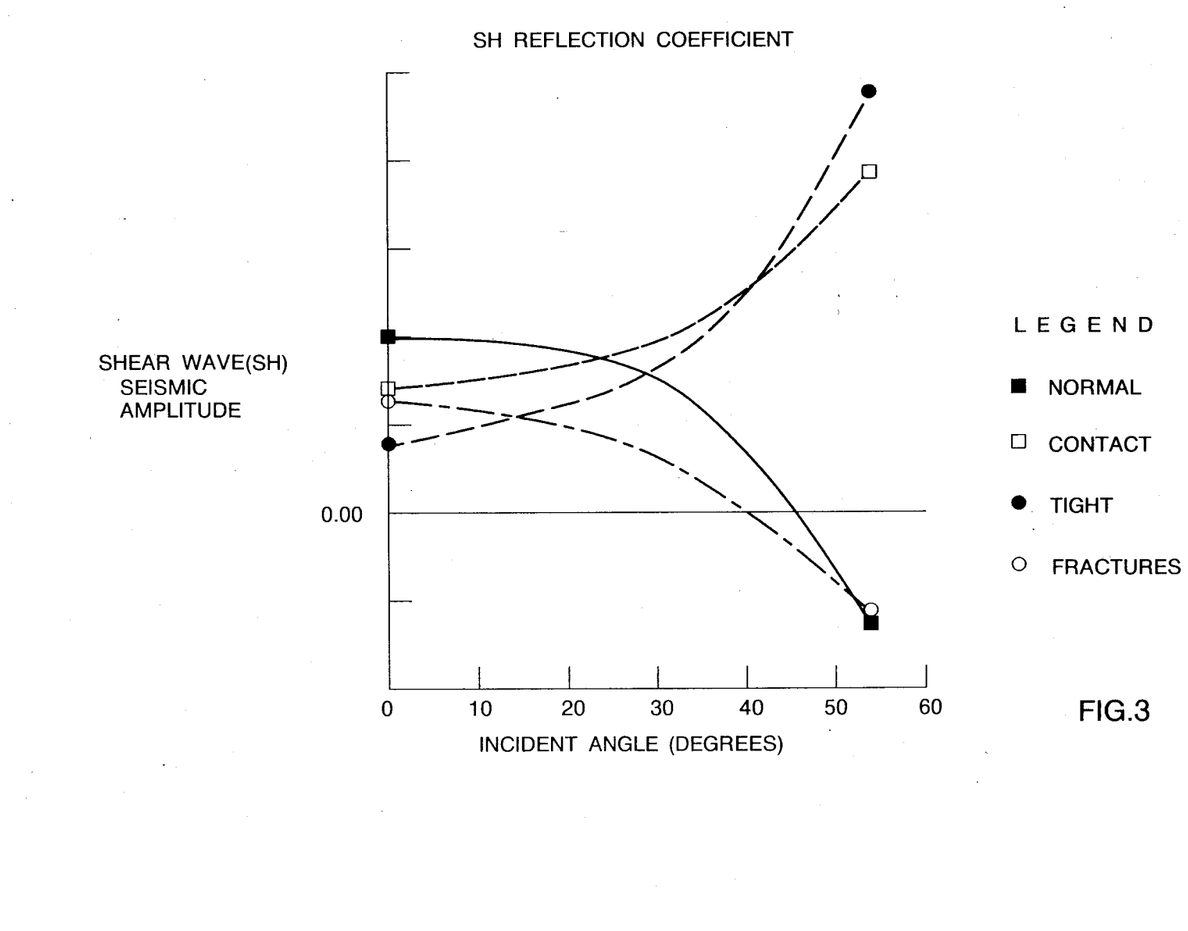
FIG. 3 is a representation of a plot of amplitudes of shear wave seismic signals as a function of incident angle for reflected shear (Sh) seismic energy for various models of reflecting boundaries.
Figure 4:
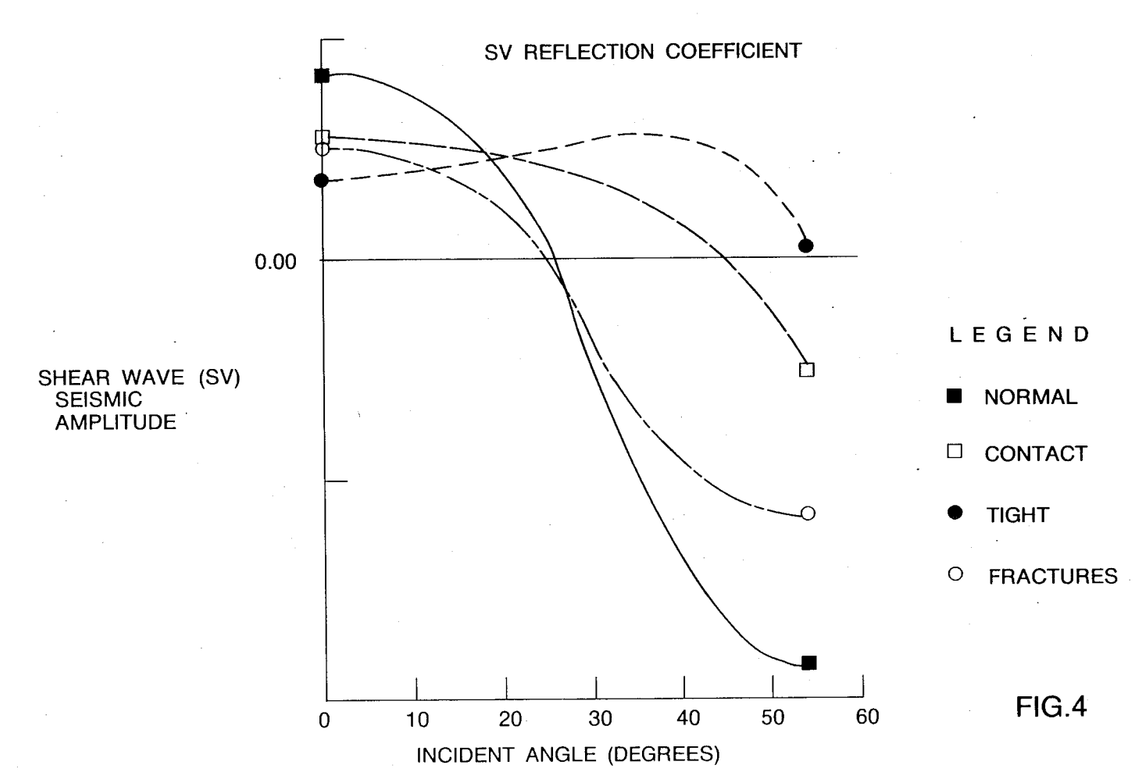
FIG. 4 is a representation of a plot of amplitudes of shear wave seismic signals for reflected shear (Sv) seismic energy for various models of reflecting boundaries.

With reference now to FIGS. 3 and 4, for the case of a seismic event representative of a "Fluid Contact" reflection, $\Delta\rho/\rho \neq 0$ while $\Delta\mu/\mu = 0$, and the general expressions for $R_{Sv}(\theta)$ and $R_{Sh}(\theta)$ reflection coefficients reduce to Equations (19) and (20) below for angles of incidence less than 35°:

$$R_{Sv}(\theta) \approx -[\tfrac{1}{2}][(\Delta\rho/\rho) - (\Delta\rho/\rho)\tan^2\theta] \qquad (19)$$

$$R_{Sh}(\theta) = -[\tfrac{1}{2}][(\Delta\rho/\rho) + (\Delta\rho/\rho)\tan^2\theta] \qquad (20)$$

The $R_{Sh}(\theta)$ reflection amplitude will increase with incidence angle $\theta$ by an amount directly proportional to the density contrast (i.e., to gas saturation). The $R_{Sv}(\theta)$ reflection coefficient will decrease with incidence angle $\theta$ by the same amount, and the normal incidence or near-range reflection coefficients are equal for isotropic formations.

For a seismic event representative of a "Fractures" reflection event ($\Delta\rho/\rho = 0$ and $\Delta\mu/\mu \neq 0$), the general expressions for $R_{Sv}(\theta)$ and $R_{Sh}(\theta)$ reduce (at small angles) to:

$$R_{Sv}(\theta) \approx -[\tfrac{1}{2}][(\Delta\mu/\mu) - 7(\Delta\mu/\mu)\tan^2\theta] \qquad (21)$$

$$R_{Sh}(\theta) = -[\tfrac{1}{2}][(\Delta\mu/\mu) - (\Delta\mu/\mu)\tan^2\theta] \qquad (22)$$

Both the $R_{Sv}(\theta)$ and $R_{Sh}(\theta)$ reflection coefficients will decrease with incidence angle, the $R_{Sv}(\theta)$ reflection coefficient having the greatest decrease.

For a seismic event representative of a "Normal Lithology" reflection, where the fractional rigidity contrast and the fractional density contrast have a positive correlation such that $\Delta\mu/\mu = \Delta\rho/\rho$, the general expressions for the reflection coefficients $R_{Sv}(\eta)$ and $R_{Sh}(\theta)$ reduce to:

$$R_{Sv}(\theta) = -[\tfrac{1}{2}][(\Delta\mu/\mu) + (\Delta\rho/\rho) - 8(\Delta\mu/\mu)\tan^2\theta] \qquad (23)$$

$$R_{Sh}(\theta) = -[\tfrac{1}{2}][(\Delta\mu/\mu) + (\Delta\rho/\rho)] \qquad (24)$$

Here the $R_{Sh}(\theta)$ reflection coefficient is independent of incidence angle, while the $R_{Sv}(\theta)$ decreases with incidence angle. This is actually a limiting case, since typically $\Delta\mu/\mu > \Delta\rho/\rho$, and both $R_{Sv}(\theta)$ and $R_{Sh}(\theta)$ will then decrease with range for "Normal Lithology" reflections. The $R_{Sv}(\theta)$ reflection coefficient again shows a greater decrease than the $R_{Sh}(\theta)$ reflection coefficient.

For a seismic event representative of a "Tight" reflection, where the fractional rigidity contrast and fractional density contrasts have a negative correlation such that $\Delta\mu/\mu \approx -\Delta\rho/\rho$, the general expressions for $R_{Sh}(\theta)$ and $R_{Sv}(\theta)$ reduce to:

$$R_{Sv}(\theta) = +[\tfrac{1}{2}][6(\Delta\mu/\mu)\tan^2\theta] \qquad (25)$$

$$R_{Sh}(\theta) = +[\tfrac{1}{2}][2(\Delta\mu/\mu)\tan^2\theta] \qquad (26)$$

Here both $R_{Sh}(\theta)$ and $R_{Sv}(\theta)$ increase initially with incidence angle, the normal incidence or near-range values being small or zero in both cases.

DETERMINING ATTRIBUTES

The shear wave seismic signal or trace amplitudes associated with a seismic event can be aligned and an improved measure of the shear wave seismic signal or trace amplitude as a function of incidence angle can be obtained in a manner known to those skilled in the art and discussed below. A solution to Equations (9) or (10) can be obtained by performing a least squares fit thereto of the measure of the shear wave (Sh) or (Sv) trace amplitudes, respectively, as a function of incident angle.

Figure 5:
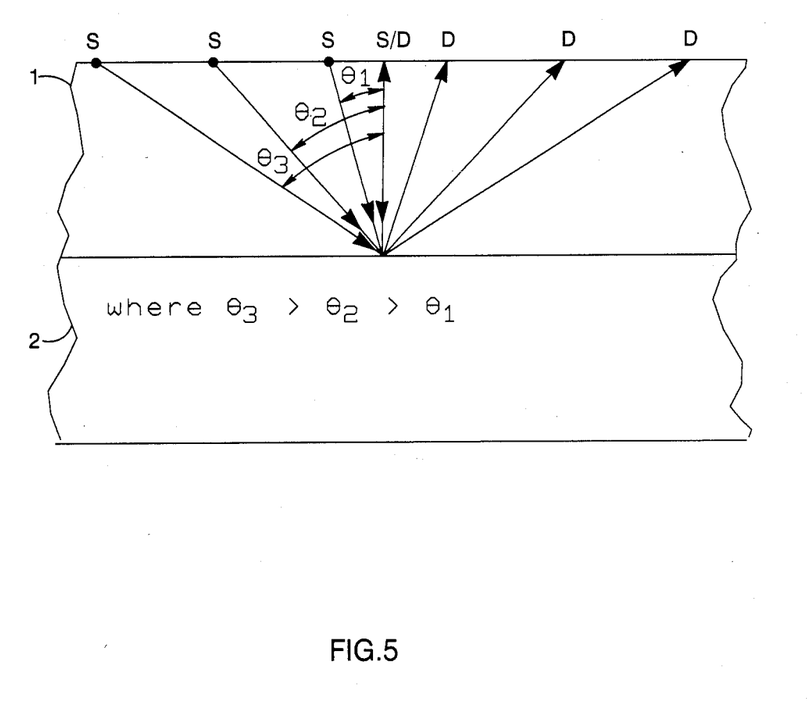
FIG. 5 is a schematic of a common depth point gather of seismic signals.

By way of example, each offset shear wave signal or trace of an unstacked common depth point (CDP) gather of shear wave seismic signals or traces has a different angle of incidence for a given formation interface as seen in FIG. 5. For a selected seismic event representative of the formation interface, such CDP gathers of shear wave seismic signals can be used to obtain a least-squares solution for the attributes $C_0, C_1$ and $D_0, D_1$ of Equations (9) and (10), respectively.

Sorting offset shear wave seismic signals or traces into CDP gathers is merely exemplary since other sorting techniques can be employed which sequence the offset seismic signal in order of increasing or decreasing incident angle, such as common source point. Another example would be a set of plane wave responses, e.g., the result of slant stacking of seismic data, normally indexed in terms of the ray parameter p and intercept time $\tau$. All such seismic data sets containing seismic reflection data with variable incident angle $\theta$ can be regarded as simple modifications to the invention herein using CDP seismic data as exemplar.

Alignment of the seismic event can be improved by cross-correlating a segment of each offset in the shear wave seismic signals or traces with a segment of a referenced shear wave seismic signal. The reference shear wave seismic signal can comprise a CDP stack of the offset shear wave seismic signals or traces. An improved measure of the amplitude of each offset shear wave seismic signal is then obtained as a function of the incident angle.

That high intensity seismic events or bright spots exist within seismic data and can be important in geophysical exploration has been recognized; however, quantification of the subtle variations in the seismic signal or trace amplitude as a function of the incident angle has been, heretofore, impeded because such variations can be small when compared to the magnitude of the seismic signal or trace amplitude. As such, the true incident angle dependent amplitude variations can easily be lost in the background noise level.

Figure 6:
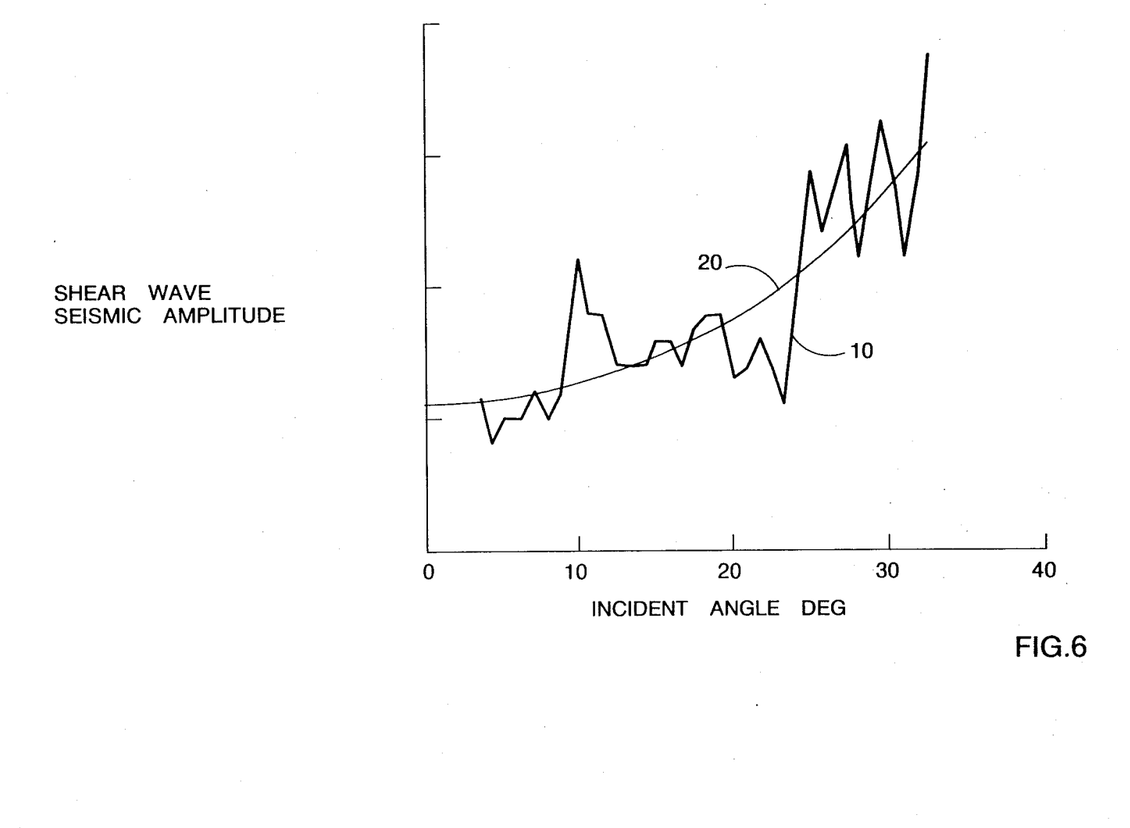
FIG. 6 is a plot of the variation of offset shear wave seismic signal or trace amplitudes as a function of incident angle and a least squares fit thereto of either Equation 9 or 10 for a selected seismic event.

Curve 10 of FIG. 6 is a representation of amplitude values of a CDP gather of offset shear wave seismic signal or trace as a function of incident angle for reflected shear wave seismic energy for a given seismic event; however, Curve 10 is merely intended to guide the eye with respect to the amplitude values for each offset signal. Curve 20 is representative of a least squares fit thereto using Equation (9) or (10). Here the maximum incident angle $\theta$ is less than 35°. As described above, the attributes $C_0$ and $C_1$ as well as $D_0$ and $D_1$ can provide a quantitative measure for identifying gaseous hydrocarbon and for inferring changes in the geological character of the subterranean formation.

Since variations in the offset shear wave seismic signal or trace amplitude as a function of the incident angle can easily be lost in the noise level, the seismic data are first processed to balance the frequency content of the near range and the far range offset shear wave seismic signals or traces. The seismic data is then corrected for surface and residual statics; corrected for true relative amplitude, muted to remove first break energy; corrected for normal moveout; bandpass filtered for optimum signal-to-noise ratio; and sorted into unstacked ordered-incident-angle gathers of the offset shear wave seismic signals or traces, such as the unstacked CDP gather of seismic signals or traces. Those skilled in the art will appreciate that other methods of processing seismic data to obtain a true measure of seismic signal reflection amplitude as a function of incident angle are available.

Offset shear wave seismic signal or trace amplitudes which have been nulled are not included in the least squares fit of Equation (9) or (10). In cases where less than an adequate number of the offset signal or trace have nonzero amplitudes, the least squares fit to Equation (9) or (10) is not attempted. In the preferred embodiment, at least one-half the offset seismic signal or trace lobe amplitudes are non-zero before a least squares fit to Equation (9) or (10) is attempted.

To facilitate association of the offset event recording position with the incident angle of the offset event, an analytic interval shear velocity relation is used such as:

$$V(z) = V_0 (1 + Kz)^{1/n} \tag{27}$$

The parameters ($V_0$, K, n) are specified by the user while z is vertical distance from which incident angles can be calculated as a function of time and range.

Equation (27) avoids the need for a time consuming ray tracing procedure, although ray tracing is a viable alternative. The parameters governing the analytical shear velocity function ($V_0$, K, n) are specified by the user based on previous fitting to observed stacking velocity functions. One analytical velocity function can be used for the entire set of seismic data or the velocity function can be varied with position. The calculation of the incident angle associated with an event time of an offset shear wave seismic signal or trace can utilize the local slope of the observed seismic event, i.e., the ray parameter p(x,t) in the expression:

$$\theta = \arcsin(V(t_o) p(x,t)) \tag{28}$$

where $\theta$ equals the incident angle at time t of the reflection whose normal-incidence time is t0; x equals the source-receiver offset and V(z) is equivalent to:

$$V(t_o) = V_0 \left( 1 + \left( \frac{n-1}{n} \right) K V_0 \frac{t_o}{1} \right)^{1/(n-1)} \tag{29}$$

and $$p(x,t) = \frac{dx}{dt} \simeq (x_2 - x_1)/(t_2 - t_1) \tag{30}$$

and $$t = \left( t_o^2 + \left( \frac{x}{V_{st}(t_o)} \right)^2 \right)^{\frac{1}{2}} \tag{31}$$

where $V_{st}(t_o)$ is the observed stacking velocity function and $t_1$ and $t_2$ are the arrival times of the same event at locations $x_1$ and $x_2$, respectively. Analytical velocity functions other than those previously described may be substituted as required for fitting the observed data. Those skilled in the art will recognize that various other methods can be employed to associate a seismic event with the incident angle.

CONCLUSION

It is now apparent that exploration diagnostic information can be obtained from the quantification and display of combinations of the attributes. In its most elementary form, such quantification consists simply of true relative amplitude plots of variable range, (e.g., Common-Depth-Point gather) data sets for reflected Sv shear waves and Sh shear waves separately. Amplitude scaling, determined from near-range traces only, ensures that corresponding reflections on the Sv and Sh data sets indeed have the same amplitude at normal incidence. Visual comparison of Sv and Sh shear wave seismic signal amplitude variation with incidence angle then indicates whether a particular seismic event is a "Normal Lithology" reflection shear wave seismic signal (Sv and Sh amplitudes both decrease with range), a "Tight" reflection such as anhydrite (Sv and Sh amplitude both increases with range), or a "Fluid Contact" reflection (Sv shear wave seismic signal amplitude decreases with range while Sh shear wave seismic signal amplitude increases with range by the same amount).

Further analysis and manipulation of the scaled amplitude of Sv and Sh shear wave seismic data sets can provide yet additional exploration diagnostic information.

The actual value of the fractional rigidity contrasts relative to the fractional density contrasts may be obtained by least squares fitting the amplitude versus range behavior in the above Sv and Sh data sets according to the previously disclosed procedures to obtain values of the attributes ($D_0, D_1$ and $C_0, C_1$) and combined according to Eqs. (11-13). Alternatively, seismic trace fractional rigidity contrast cross sections and seismic trace fractional density contrast cross sections can be generated by forming near-range and midrange stacks of both the above Sv and Sh data sets, and combining the resulting data subsets according to Eqs. (5-8).

In either case, the derived values of the ratio $(\Delta\mu/\mu)/(\Delta\rho/\rho)$ can then also be color coded and superimposed on the full stack Sv or Sh seismic data sets, separately, for interpretation. Similarly, fractional density contrast and fractional rigidity contrast can be assigned a color, the intensity of which is a function of the magnitude thereof and superimposed on the full stack Sh and Sv seismic data sets either separately or in combination. In particular, recall that the rigidity-density systematics for sedimentary rock are such that:

a. $(\Delta\mu/\mu)/(\Delta\rho/\rho) < 0$ for a "Tight" reflection event
b. $(\Delta\mu/\mu)/(\Delta\rho/\rho) = 0$ for a "Fluid Contact" reflection event
c. $(\Delta\mu/\mu)/(\Delta\rho/\rho) > 0$ for a "Normal Lithology" reflection event
d. $(\Delta\mu/\mu)/(\Delta\rho/\rho) \to \infty$ for a "Fractures" reflection event.

Thus it results that shear wave reflection coefficients' behavior as a function of incident angle can provide all the exploration diagnostic information available from the corresponding compressional wave reflection coefficients' behavior as a function of incident angle and more. The shear wave reflection coefficients of the earth's formations do indeed change at a gas-water contact, i.e., at a change in the pore fluid content of the formation, and this change is such that a positive progressive change in shear wave seismic signal amplitude as a function of incident angle is exhibited for reflected Sh shear wave seismic energy. Significantly, this change in reflected shear wave seismic signal amplitude as a function of incident angle can be related to the degree of gas saturation in the pore space. This behavior is contrary to conventional wisdom and represents a major advance in the "state of the art" of shear wave seismic exploration techniques (i.e., the direct detection of hydrocarbons with shear waves).

The foregoing disclosure and description of the invention are illustrative of and explanatory thereof, and various changes can be made without departing from the spirit of the invention.

What we claim is:

1. A method of seismic exploration including processing a plurality of shear wave seismic signals for determining changes of formation properties, comprising the steps of:
   obtaining a measure or shear wave reflection coefficient as a function of incident angle for selected seismic events within a gather of shear wave seismic signals;
   developing sets of attributes descriptive of variations in the shear wave reflection coefficient as a function of incident angle from the amplitude of the shear wave seismic signals for the selected events; and
   determining changes in formation properties from the sets of attributes for the selected seismic event.

2. The method of claim 1 wherein the step of obtaining the measure of the shear wave reflection coefficient includes the steps of:
   obtaining a measure of the amplitude of each shear (Sh) wave seismic signal as a function of incident angle for a selected seismic event in an incident angle ordered gather of shear (Sh) wave seismic signals; and
   statistically fitting the measure of amplitude of each shear (Sh) wave seismic signal to:

$$R_{Sh}(\theta) = D_0 + D_1 \tan^2\theta$$

where
   $D_0$ and $D_1$ comprise a first set of attributes;
   $R_{Sh}(\theta)$ is a mesure of the Sh reflection coefficient; and
   $\theta$ is the incident angle, wherein the maximum incident angle is approximately 35°.

3. The method of claim 1 wherein the step of obtaining the measure of the shear wave reflection coefficient includes the steps of:
   obtaining a measure of the amplitude of each shear (Sv) wave seismic signal as a function of incident angle for a selected seismic event in an incident-angle-ordered gather of shear (Sv) wave signals; and
   statistically fitting the measure of amplitude of each shear (Sv) wave seismic signal to:

$$R_{Sv}(\theta) = C_0 + C_1 \tan^2\theta$$

where
   $C_0$ and $C_1$ comprise a second set of attributes;
   $R_{Sv}(\theta)$ is a measure of the Sv reflection coefficient; and
   $\theta$ is the incident angle, wherein the maximum incident angle is approximately 35°.

4. The method of claim 2 wherein the first set of attributes provides a measure of changes in formation properties represented by the selected seismic event as set forth below:

$$D_0 = -(\tfrac{1}{4})[(\Delta\mu/\mu)+(\Delta\rho/\rho)]$$

and $$D_1 = (\tfrac{1}{4})[(\Delta\mu/\mu)-(\Delta\rho/\rho)]$$

where
$\rho$ is the average density of adjacent formations;
$\mu$ is the average shear modulus of adjacent formations; and
$\Delta$ indicates a change in a given property.

5. The method of claim 3 wherein the second set of attributes provides a measure of changes in formation properties represented by the selected seismic event as set forth below:

$$C_0 = -(\tfrac{1}{4})[(\Delta\mu/\mu)+(\Delta\rho/\rho)]$$

$$C_1 = +(\tfrac{1}{4})[7(\Delta\mu/\mu)+(\Delta\rho/\rho)]$$

where
$\rho$ is the average density of adjacent formations;
$\mu$ is the average shear modulus of adjacent formations; and
$\Delta$ indicates a change in a given property.

6. The method of claim 4 further including the step of summing the attributes of the first set of attributes to obtain a measure of the rigidity contrasts for the formations represented by the selected seismic event.

7. The method of claim 4 further including the step of summing the attributes of the first set of attributes to obtain a measure of the density contrast for the formations represented by the selected seismic event.

8. The method of claim 6 further including the steps of:
assigning a selected color to the measure of the rigidity contrast, the intensity of the color being a function of the magnitude of the measure of the rigidity contrast; and
overlaying the selected colored measure of the rigidity contrast onto a corresponding seismic section of shear wave seismic signals.

9. The method claim 7 further including the steps of:
assigning a selected color to the measure of the density contrast, the intensity of the color being a function of the magnitude of the measure of the density contrast; and
overlaying the selected colored measure of the density contrast onto a corresponding seismic section of shear wave seismic signals.

10. A method of seismic exploration including processing a plurality of shear wave seismic signals, comprising the steps of:
obtaining a measure of shear wave seismic signal amplitudes for selected seismic events in a Common Depth Point (CDP) gather of shear wave seismic signals as a function of incident angle;
fitting the shear wave seismic signal amplitudes for selected seismic events to a function of incident angle;
determining attributes of the function of incident angle; and
determining a measure of the rigidity contrast for formations represented by the selected seismic events by a first sum of the attributes.

11. The method of claim 10 further including the step of determining a measure of the density contrast for formations represented by the selected seismic events by a second sum of the attributes.

12. The method of claim 10 wherein the step of determining attributes includes the step of determining a first set of attributes by fitting a measure of the shear (Sh) wave seismic signal amplitudes for selected seismic events of a CDP gather of shear (Sh) wave seismic signals to:

$$R_{Sh}(\theta) = D_0 + D_1 \tan^2\theta$$

where $R_{Sh}(\theta)$ is the shear (Sh) wave reflection coefficient and $D_0$ and $D_1$ comprise the first set of attributes.

13. The method of claim 12 wherein the measure of the rigidity contrast is determined by summing the first set of attributes according to:

measure of rigidity contrast = $(D_0 - D_1)$.

14. The method of claim 12 wherein a measure of density contrast is determined according to:

measure of density contrast = $(D_0 + D_1)$.

15. The method of claim 10 further including steps of overlaying the measure of the rigidity contrast for selected seismic events on a seismic section obtained from the shear wave seismic signals.

16. The method of claim 11 further including the step of overlaying the measure of the density contrast for selected seismic events on a seismic section obtained from the shear wave seismic signal.

17. The method of claim 11 wherein the step of determining attributes includes the step of determining a second set of attributes by fitting a measure of the shear (Sv) wave seismic signal amplitudes for selected seismic events of a CDP gather of shear (Sv) wave seismic signals to:

$$R_{Sv}(\theta) = C_0 + C_1 \tan^2\theta$$

where $R_{Sv}(\theta)$ is the shear wave (Sv) reflection coefficient and $C_0$ and $C_1$ comprise the second set of attributes.

18. The method of claim 17 wherein the measure of the rigidity contrast is determined by summing the second set of attributes according to:

measure of rigidity contrast = $(C_1 + C_0)$

19. The method of claim 17 wherein the measure of the density contrast is determined by summing the second set of attributes according to:

measure of density contrast = $(C_1 + 7C_0)$

20. The method of claim 11 further including overlaying the measure of the density contrast and the measure of rigidity contrast for selected seismic events on a seismic section obtained from the shear wave seismic signals.

21. The method of claim 11 further including obtaining a measure of the anisotropy of the earth's subterranean formations from the first and second sets of attributes.

22. The method of claim 10 further including obtaining a measure of the volume fraction gas saturation in the earth's subterranean formations from the measure of the density contrast.

23. A method of seismic exploration including processing a common depth point gather of shear wave seismic signals comprising the steps of:
   (a) determining a measure of a first shear wave reflection coefficient for a selected seismic event in the common depth point gather of shear wave seismic signals;
   (b) determining a measure of a second shear wave reflection coefficient for the selected seismic event in the common depth point gather of shear wave seismic signals; and
   (c) determining a measure of the density contrast of the subterranean formations represented by the selected seismic event from a first sum of the first and second measures of the shear wave reflection coefficients for the selected seismic event.

24. The method of claim 23, further including the step of determining a measure of the rigidity contrast of the subterranean formations represented by the selected seismic event from a second sum of the first and second reflection coefficients for the selected seismic event.

25. The method of claim 23 wherein the step of determining the measure of the density contrast of the subterranean formations represented by the selected seismic event from the first sum of the first and second reflection coefficients is an average of the first and second reflection coefficients at midrange angles of incidence.

26. The method of claim 24 wherein the step of determining the measure of the rigidity contrast of the subterranean formations represented by the selected seismic event from the second sum of the first and second reflection coefficients is the algebraic difference of an average of the first and second reflection coefficients at near-range angles of incidence and of an average of the first and second reflection coefficients at midrange angles of incidence.

27. The method of claim 24 further including the step of inferring changes in the subterranean formations represented by the selected seismic event from a ratio of the measure of the rigidity contrasts to the measure of the density contrasts for the selected seismic event.

28. The method of claim 23 wherein the step of determining the measure of the first shear wave reflection coefficient is obtained according to:

obtaining a measure of the amplitude of each shear (Sh) wave seismic signal as a function of incident angle for a selected seismic event in an incident angle ordered gather of shear (Sh) wave seismic signals; and statistically fitting the measure of amplitude of each shear (Sh) wave seismic signal to:

$$R_{Sh}(\theta) = D_0 + D_1 \tan^2\theta$$

where $D_0$ and $D_1$ comprise a first set of attributes;

$R_{Sh}(\theta)$ is a measure of the Sh reflection coefficient; and $\theta$ is the incident angle, wherein the maximum incident angle is approximately 35°.

29. The method of claim 23 wherein the step of determining the measure of the second shear wave reflection coefficient is obtained according to:

obtaining a measure of the amplitude of each shear (Sv) wave seismic signal as a function of incident angle for a selected seismic event in an incident-angle-ordered gather of shear (Sv) wave signals; and statistically fitting the measure of amplitude of each shear (Sv) wave seismic signal to:

$$R_{Sv}(\theta) = C_0 + C_1 \tan^2\theta$$

where $C_0$ and $C_1$ comprise a second set of attributes;

$R_{Sv}(\theta)$ is a measure of the Sv reflection coefficient; and $\theta$ is the incident angle, wherein the maximum incident angle is approximately 35°.

* * * * *

UNITED STATES PATENT AND TRADEMARK OFFICE
CERTIFICATE OF CORRECTION

PATENT NO. : 4,755,972                              Page 1 of 2

DATED      : July 5, 1988

INVENTOR(S) : Kenneth E. Hanson; Leon A. Thomsen

It is certified that error appears in the above-identified patent and that said Letters Patent is hereby corrected as shown below:

Column 4, Line 35, "$\Delta\mu$", second occurrence, should read --$\Delta\rho$--.

Column 5, Line 5, "$\Delta\mu/\Delta$ and $\Delta\mu/\mu$" should read --$\Delta\mu/\mu$ and $\Delta\rho/\rho$--.

Eqn. 5, "$R_{Sv}(27) + R_{SH}(27) \simeq -[1/2](\Delta\rho$"

should read --$R_{Sv}(27) + R_{Sh}(27) \simeq -[1/2](\Delta\rho/\rho)$--.

Line 16, "tar" should read --tan--.

Line 64, "$D_1 = (1/4)[(\Delta\rho/\rho) - (\Delta\rho/\rho)]$"

should read --$D_1 = (1/4)[(\Delta\mu/\mu) - (\Delta\rho/\rho)]$--.

Line 65, delete "$C_1$" at the end of the line.

Line 66, insert --$C_1$-- at the beginning of the line.

UNITED STATES PATENT AND TRADEMARK OFFICE
CERTIFICATE OF CORRECTION

PATENT NO. : 4,755,972

DATED : July 5, 1988

INVENTOR(S) : Kenneth E. Hanson; Leon A. Thomsen

It is certified that error appears in the above-identified patent and that said Letters Patent is hereby corrected as shown below:

Column 7, Eqn. 15, "$\mu = \mu_s * (1-2-34\phi_c)$" should read --$\mu = \mu_s * (1-2\phi-34\phi_c)$--

Eqn. 18, insert a right parenthesis -- ) -- at the end.

Column 8, Line 42, "$R_{Sv}(\eta)$" should read -- $R_{Sv}(\theta)$ --.

Line 52, " > " should read -- $\geq$ --.

Column 10, Line 47, "t0" should read -- $t_o$ --.

Column 10, Eqn. 29, " $\frac{t_o}{1}$ " should read -- $\frac{t_o}{2}$ --.

Signed and Sealed this

Fifth Day of September, 1989

Attest:

DONALD J. QUIGG

Attesting Officer

Commissioner of Patents and Trademarks